(12) United States Patent
Kramer

(10) Patent No.: US 8,197,073 B2
(45) Date of Patent: Jun. 12, 2012

(54) MIRROR APPARATUS FOR USE IN THE PRESENCE OF STEAM

(76) Inventor: Kevin Kramer, High Point, NC (US)

( * ) Notice: Subject to any disclaimer, the term of this patent is extended or adjusted under 35 U.S.C. 154(b) by 569 days.

(21) Appl. No.: 12/353,302

(22) Filed: Jan. 14, 2009

(65) Prior Publication Data

US 2010/0177385 A1    Jul. 15, 2010

(51) Int. Cl.
*G02B 23/16* (2006.01)
*G02B 5/124* (2006.01)
*G02B 5/08* (2006.01)

(52) U.S. Cl. .................. 359/513; 359/514; 359/884

(58) Field of Classification Search .......... 359/512–514, 359/884
See application file for complete search history.

(56) References Cited

U.S. PATENT DOCUMENTS

| | | | |
|---|---|---|---|
| 3,877,780 A * | 4/1975 | Taylor | 359/509 |
| 4,060,712 A | 11/1977 | Chang | |
| 4,832,475 A | 5/1989 | Daniels | |
| 5,313,316 A | 5/1994 | Davidge | |
| 5,731,569 A | 3/1998 | Crescenzo | |
| 6,420,682 B1 | 7/2002 | Sellgren et al. | |
| 6,443,578 B1 | 9/2002 | Finnigan | |
| 6,619,805 B1 * | 9/2003 | Roth | 359/507 |
| 6,682,198 B2 * | 1/2004 | Mangano | 359/840 |
| 6,796,665 B1 | 9/2004 | Pillinger | |
| 7,131,739 B2 | 11/2006 | Sellgren et al. | |
| 7,347,091 B2 | 3/2008 | Gillette | |

FOREIGN PATENT DOCUMENTS

| | | |
|---|---|---|
| EP | 0 374 171 | 10/1994 |
| EP | 0 633 739 | 8/1996 |
| EP | 0 871 051 A1 | 10/1998 |
| GB | 1127314 | 9/1968 |
| GB | 2222077 | 2/1990 |
| JP | 2006346173 | 12/2006 |
| WO | 01/73483 | 10/2001 |

* cited by examiner

*Primary Examiner* — Jade R Chwasz
(74) *Attorney, Agent, or Firm* — Summa, Additon & Ashe, P.A.

(57) ABSTRACT

A mirror hangs from a transparent enclosure which may surround a shower, a bathtub, or other bathing area. The mirror may be in a position that avoids condensation on the surface of the mirror from steam emitted from the transparent enclosure. The mirror may also be in a position so that the mirror reflects light into the enclosure. An individual in the bathing area may use the mirror from inside the transparent enclosure without the mirror fogging, which is a common problem associated with using mirrors in a bathing area. The mirror may hang from the outside of the transparent enclosure and optionally includes a sealing element or a frame surrounding the reflective element to further avoid contact with steam.

28 Claims, 4 Drawing Sheets

MIRROR APPARATUS FOR USE IN THE PRESENCE OF STEAM

FIELD OF THE INVENTION

The present invention embraces a mirror apparatus for use in the presence of steam emitted by an enclosure that is at least partially transparent, such as an enclosure surrounding a shower or bathtub. The mirror remains fog-free and visible from within the enclosure.

BACKGROUND OF THE INVENTION

Mirrors are commonly used while bathing or showering to aid in personal grooming tasks. In a high humidity environment such as a bathroom, water vapor will often condense on a mirror surface causing the mirror to fog. It is therefore desirable to employ mirrors that can remain fog-free in a humid environment.

A method commonly used to prevent a mirror from fogging is to keep the temperature of the mirror higher than that of the dew point (i.e., the temperature at which water vapor in the ambient air will condense on a surface). The mirror temperature can be maintained above the dew point by employing a heating element for heating the mirror. Such heating elements are typically connected to an electrical source. Exemplary mirrors with heating elements are disclosed in U.S. Pat. No. 4,060,712 to Chang, U.S. Pat. No. 5,731,569 to Crescenzo, U.S. Pat. No. 6,420,682 to Sellgren et al., U.S. Pat. No. 6,796,665 to Pillinger, and U.S. Pat. No. 7,131,739 to Sellgren et al. Such mirrors can be difficult to install, because they require a connection to an electrical source. Furthermore, employing an electrical device in a moist environment can prove hazardous.

Mirrors can also be heated with hot water. Typically, hot water is drawn from a bathroom plumbing system and passes behind the mirror so that the mirror remains heated. Exemplary mirrors heated with hot water are disclosed in U.S. Pat. No. 4,832,475 to Daniels and in U.S. Pat. No. 5,313,316 to Davidge. Mirrors heated with water can be difficult to install and risk spraying or leaking water.

Other publications disclose more technical efforts used to prevent mirrors from fogging in the presence of steam. For example, WIPO International Publication No. WO 01/73483 to Casebier discloses generating static electricity on the surface of a mirror in order to repel water vapor and prevent the mirror from fogging.

U.S. Pat. No. 6,443,578 to Finnigan discloses using a fog free mirror employing coatings that prevent condensation on the surface of the mirror. Over time the performance of such coatings degrades, which, inter alia, may lead to a poor image quality.

Accordingly, it would be desirable to have a mirror that resists the formation of fog, is simple to install, and that does not degrade over time. It would also be desirable to have a mirror that requires less frequent cleaning than conventional shower mirrors.

SUMMARY OF THE INVENTION

In one embodiment, the present invention embraces a mirror apparatus for use in the presence of steam emitted by a transparent enclosure. The mirror apparatus includes a reflective element. A hanging element is attached to the reflective element for hanging the apparatus on the outside of the transparent enclosure with the reflective element visible from within the enclosure. The reflective element is positioned so that it reflects light in the direction of the transparent enclosure and so that it remains substantially fog-free when the transparent enclosure emits steam in the vicinity of the mirror.

In another embodiment, the mirror apparatus includes a reflective element and a sealing element that is positioned around the perimeter of the reflective element for preventing the contact of steam with the reflective element. A hanging element is attached to the reflective element for hanging the mirror apparatus from a transparent wall or transparent door that are component parts of the transparent enclosure. Assuming that an individual is on the inside of the transparent enclosure, such as a person in a shower, the reflective element may be positioned on the outside of the transparent wall or door so that the reflective element reflects light in the direction of and through the transparent enclosure. One option in preventing steam from fogging the mirror is placing a sealing element flush with both the transparent enclosure and the reflective element. The reflective element remains fog-free as steam from the enclosure surrounds the reflective element.

In a third embodiment, the mirror apparatus includes a reflective element and a frame element enclosing the reflective element. A hanging element is attached to the frame element for hanging the mirror apparatus from a transparent enclosure. The reflective element is positioned so that the reflective element reflects light in the direction of the transparent enclosure. The reflective element is also positioned so that it remains substantially fog-free when the transparent enclosure emits steam.

DETAILED DESCRIPTION

The present invention embraces a mirror apparatus for use in the presence of steam emitted from a transparent enclosure. Without limiting the invention or its use, the term "transparent enclosure" as used in this Specification includes areas (e.g., bathing areas such as showers, baths, and saunas) that are at least partially surrounded by a wall that allows visibility from one side to the other. The term transparent enclosure includes clear walls (e.g., glass) as well as walls that are partially opaque but allow sufficient visibility there through to be considered transparent by an observer. A largely transparent region within a wall enclosing an area may be referred to herein as a transparency.

The invention, therefore, is suitable for use with areas in which a person stands on one side of the transparency, and the mirror is hung on an opposite side of the transparency. In one embodiment, the mirror reflects toward the transparent portion of the enclosed area so that individuals within the enclosed area can see their reflection in the mirror through the transparent enclosure. One useful aspect of the invention is its ability to allow a user within an area to see their reflection when the mirror is outside that area, on the opposite side of the enclosure.

Without limiting the invention to any particular use, one notable example of this mirror apparatus lies in its function with a shower. Shower doors and some fully enclosed showers walls often have regions that are transparent. Instead of placing a mirror within the shower where it inevitably fogs, the apparatus disclosed herein works outside the shower but still facing the user inside the shower. The person in the shower can see his reflection on the mirror through the transparency. The mirror, however, is not subject to steam and water inside the shower, making it easier to use.

Figure 1:
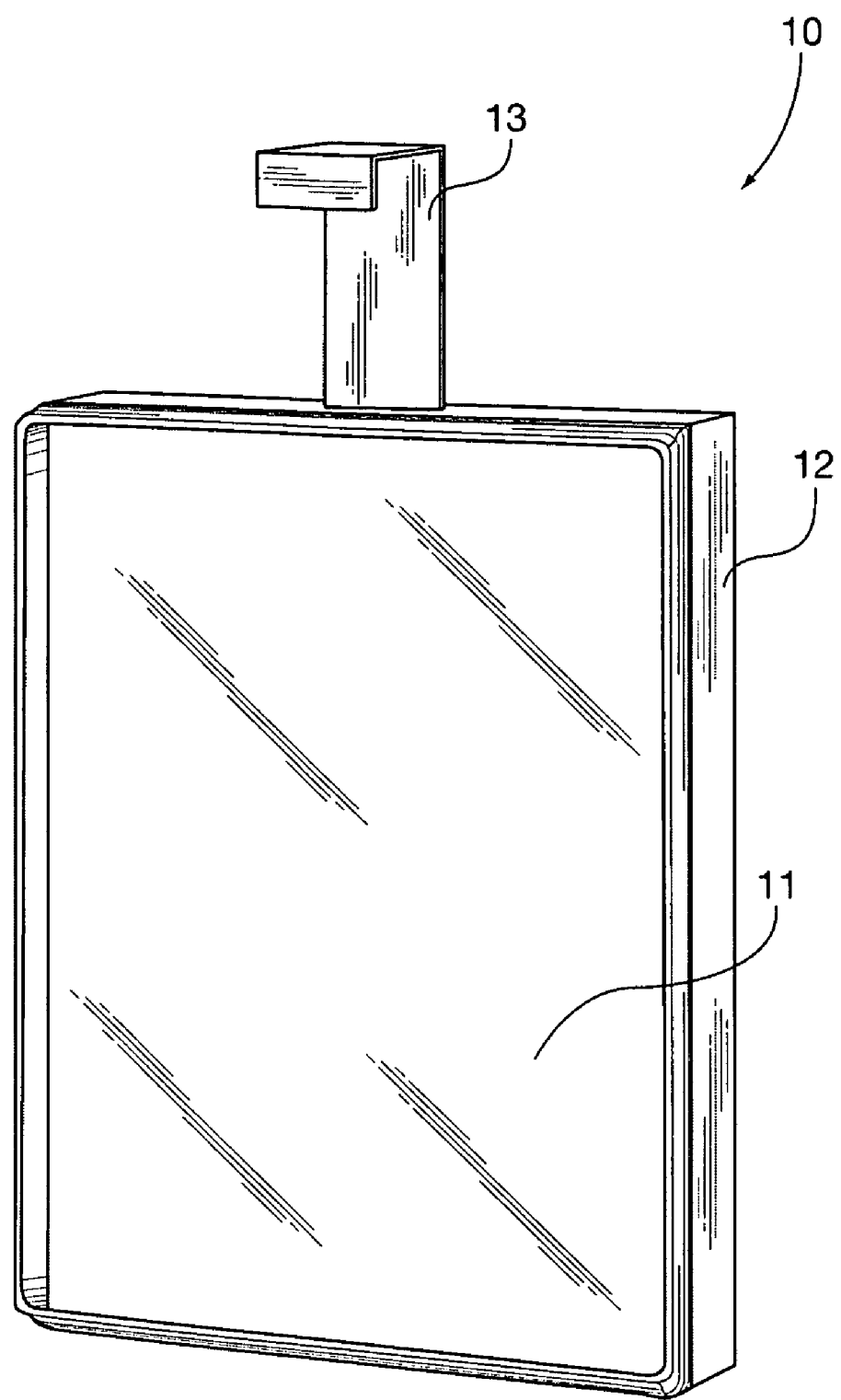
FIG. 1 schematically depicts an axonometric view of a mirror apparatus according to the present invention.

As depicted in FIG. 1, a mirror apparatus 10 includes a reflective element 11. The reflective element 11 may, for example, be a glass mirror. Alternatively, the reflective element 11 may be any other suitable reflective material.

FIG. 1 depicts a frame element 12 enclosing the reflective element 11. It will be appreciated by those of ordinary skill in the art that although the frame element 12 provides support to the reflective element 11, the mirror apparatus 10 need not include a frame element.

The mirror apparatus 10 further includes a hanging element 13. The hanging element 13 may be formed from any suitable rigid or semi-rigid material.

Figure 2:
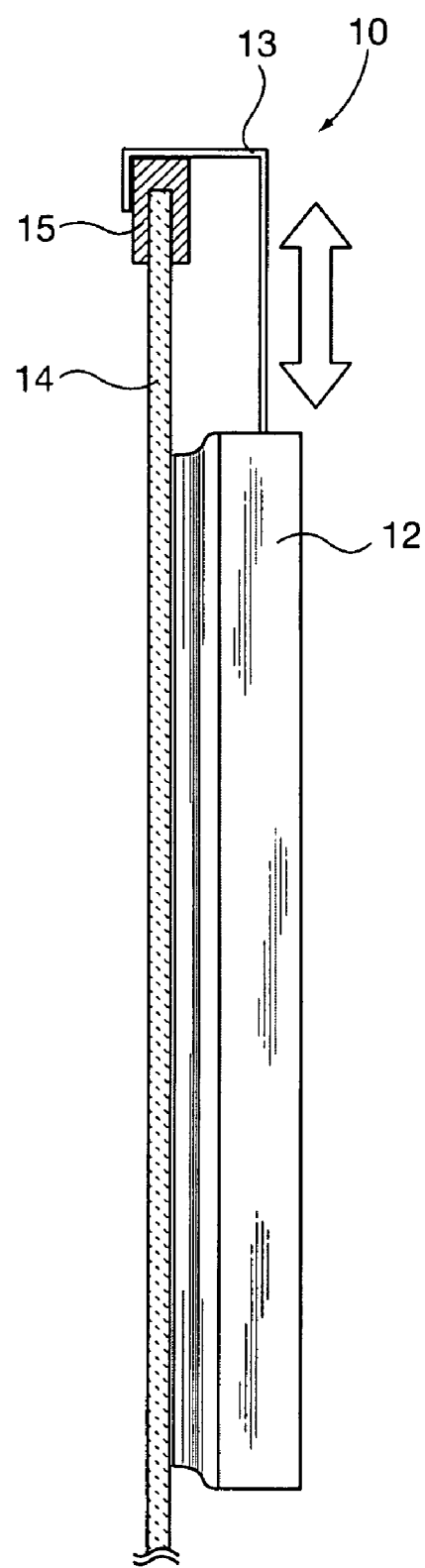
FIG. 2 schematically depicts a side elevational view of a mirror apparatus according to the present invention.

FIG. 2 depicts the hanging element 13 being used to hang the mirror apparatus 10 from a transparent enclosure 14. The hanging element 13 may engage a connecting portion 15 of the transparent enclosure 14 for attaching the hanging element 13 to the mirror apparatus 10. The hanging element 13 may be attached to the frame element 12 in a permanent or temporary arrangement. Alternatively, and particularly if the frame element 12 is absent from the mirror apparatus 10, the hanging element 13 may be attached directly to the reflective element 11 that is within the frame element 12 (see FIG. 1).

The hanging element 13 may be adjustable for varying the height of the mirror apparatus 10. To accomplish the adjustable feature, the hanging element 13 may have sliding portions that lock into place at a number of different lengths. Such a telescoping function allows the hanging element to adjust the mirror height on the outside of the transparency. This is useful to account for people of different heights using the same mirror.

Figure 4:
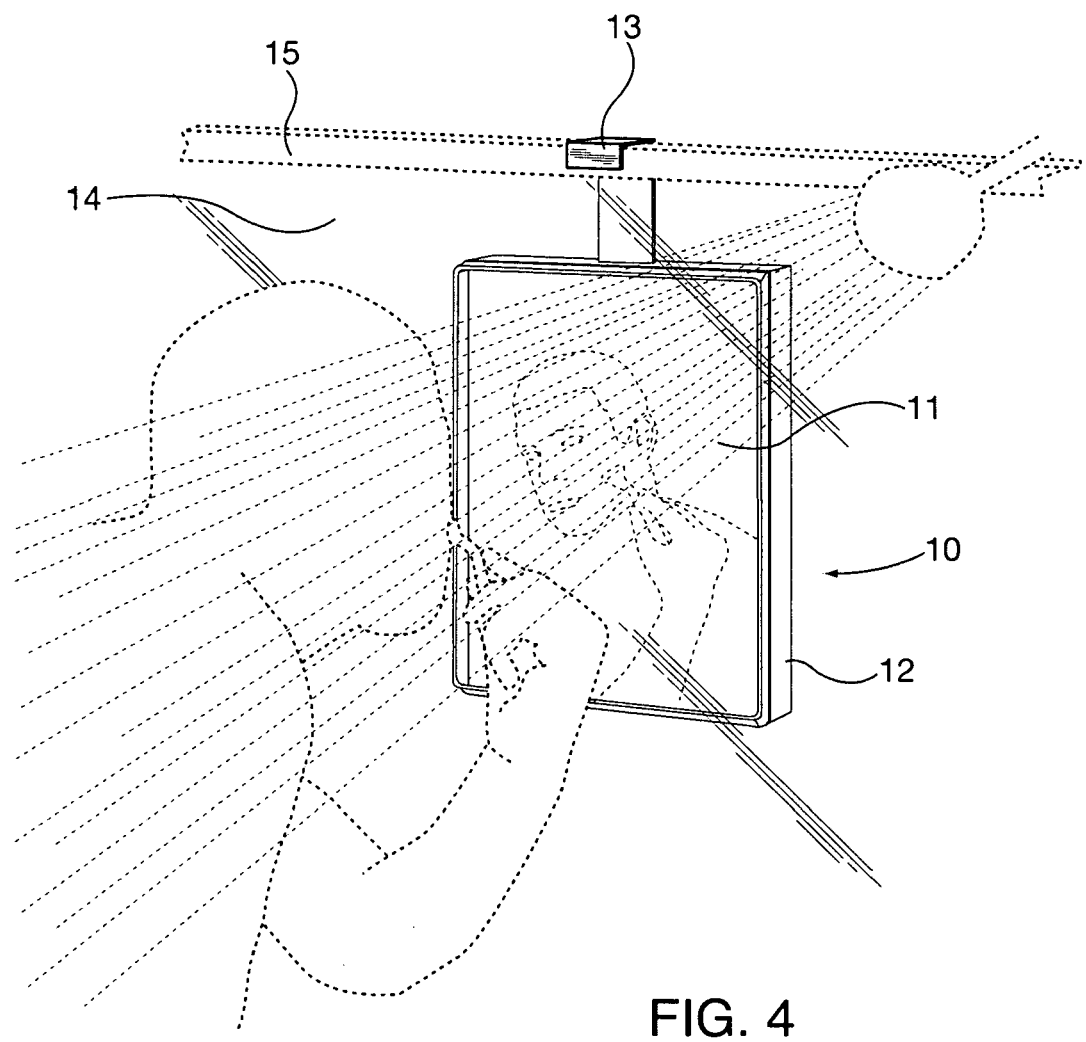
FIG. 4 schematically depicts an axonometric view of a mirror apparatus being used from inside a transparent enclosure.

As depicted in FIG. 4, the mirror apparatus 10 is hung from the transparent enclosure 14 with the reflective element 11 positioned such that the reflective element 11 reflects light in the direction of and through the transparent enclosure 14. The mirror apparatus 10 may be positioned outside the transparent enclosure 14, which would allow a person located within the transparent enclosure 14 to use the mirror apparatus 10. For example, a person taking a shower may use the mirror apparatus 10 to aid in personal hygiene tasks, such as shaving.

The transparent enclosure 14 may enclose an environment having a high concentration of steam. Without limiting the invention, the transparent enclosure may enclose a bathing area. The bathing area may be an installation such as a shower, bathtub, or sauna. It will be appreciated by those of ordinary skill in the art that when a transparent enclosure surrounds an environment having a higher concentration of steam than the exterior environment, the transparent enclosure will emit steam (i.e., the concentrations of steam within the transparent enclosure and the exterior environment will attempt to equalize). Of course, steam will not be emitted if it has no means of escape (e.g., the transparent enclosure seals its interior from the exterior environment).

For a transparent enclosure surrounding a bathing area, an opening is typically present above the transparent enclosure. Therefore, steam is typically emitted from above the transparent enclosure.

As previously described, steam may cause condensation to form on mirrors located within the transparent enclosure and even mirrors located outside of the transparent enclosure. The hanging element 13 may be used to position the reflective element 11 so that the reflective element 11 remains substantially fog free when the transparent enclosure 14 emits steam. Because of the tendency of steam to rise, condensation will typically form on higher surfaces. Accordingly, positioning the reflective element 11 below where steam is emitted from the transparent enclosure 14 can prevent or at least delay the formation of condensation on the surface of the reflective element 11.

The hanging element 13, therefore, allows for positioning the mirror apparatus 10 along side the transparency of the enclosure in the optimal position that avoids steam and condensation escaping from the inside of the enclosure. It is useful, therefore, for the mirror apparatus 10 to be lower than any steam flow out of a bathing area enclosed by the transparency discussed above.

Figure 3:
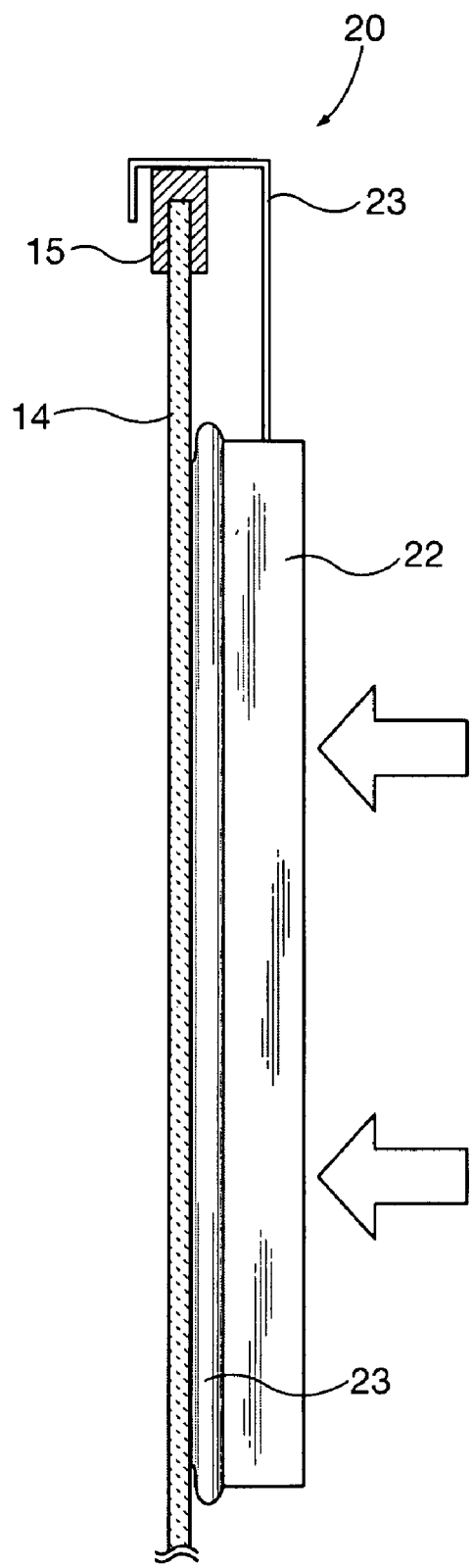
FIG. 3 schematically depicts a side elevational view of an alternative embodiment of a mirror apparatus according to the present invention.

FIG. 3 depicts an alternative mirror apparatus 20. The mirror apparatus 20 includes a reflective element 21 (not depicted) within the frame 22 and enclosed by a frame element 22. See also FIG. 1. Alternatively, the mirror apparatus 20 does not necessarily have to include a frame element. A hanging element 23 may be connected to the frame element 22 or to the reflective element 21. The hanging element 23 is used to hang the mirror apparatus 20 from a transparent enclosure 14. A sealing element 24 is positioned around the perimeter of the frame element 22. In another embodiment, the sealing element 24 may be positioned around the perimeter of the reflective element 21 itself. The mirror apparatus 20 may be positioned so that the sealing element 24 is flush with the transparent enclosure 14, thereby forming an airtight seal. An airtight seal can prevent water condensation on the surface of the reflective element 21. The sealing element 24 may be formed from an elastic polymer (e.g., rubber). Alternatively, the sealing element 24 may be formed from any other material suitable for forming an airtight seal.

In yet another alternative embodiment, a mirror apparatus 20 may lack a sealing element, but the frame element 22 may be formed from a material suitable for forming an airtight seal (e.g., an elastic polymer). The mirror apparatus 20 may be positioned so that the frame element 22 is flush with the transparent enclosure 14 whereby an airtight seal can be formed.

Figure 5:
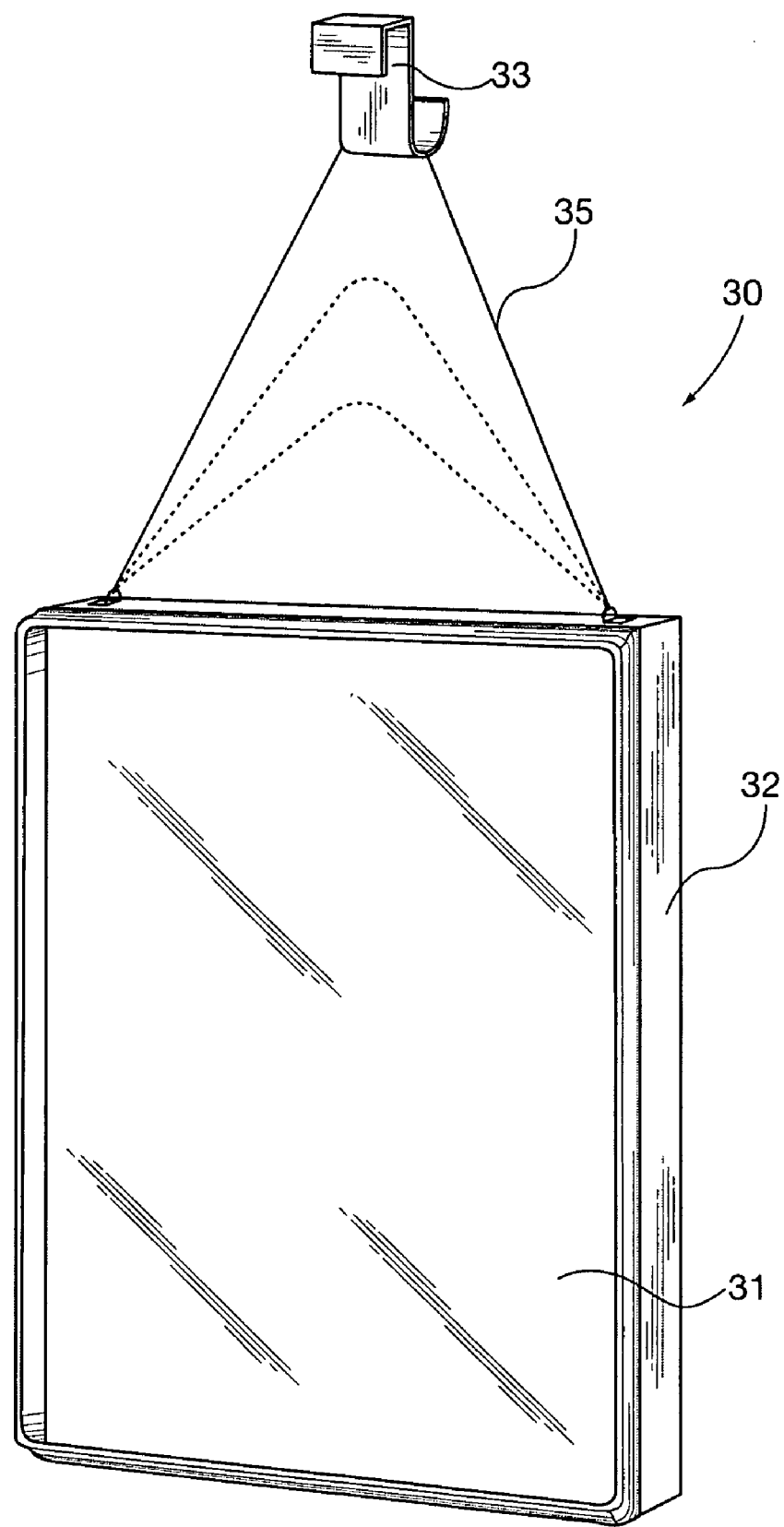
FIG. 5 schematically depicts a side elevational view of an alternative embodiment of a mirror apparatus according to the present invention that includes a cord for hanging the mirror apparatus.

In an alternative embodiment and as depicted in FIG. 5, a mirror apparatus 30 includes a reflective element 31 and a frame element 32. The mirror apparatus 30 further includes a hanging element 33, which can be used to hang the mirror apparatus 30 from a transparent enclosure, similar to the embodiments discussed previously. The hanging element 33 may be attached to the mirror apparatus 30 with a cord 35. As used herein, the term cord is not limited to a braided product but may include any string-like material (e.g., a chain, a rope, or a monofilament line) suitable for hanging the mirror apparatus 30. The cord 35 may be adjustable for hanging the mirror apparatus at various heights. Alternatively, the mirror apparatus 30 may include a plurality of cords 35 of varying lengths, depicted in FIG. 5 as dashed lines, allowing the user to select one length for hanging. The remaining cords may be removed or tucked away for later adjustments. The cord 35 may be attached to the frame element 32. Alternatively, the cord 35 may be attached to the reflective element 31.

In another embodiment, a mirror apparatus may include a second reflective element. The second reflective element is positioned on the side of the mirror apparatus opposite the first reflective element, so that the second reflective element reflects light in a direction opposite the first reflective element (i.e., opposite the transparent enclosure). One may prefer for either of the reflective elements to include a magnifying mirror for more detailed tasks. In general, having two oppositely directed mirrors may be desirable for decorative and functional benefits.

In another aspect, the present invention embraces a transparent enclosure that includes a reflective element integrally formed within the walls of the enclosure. In this embodiment, the invention encompasses, but is not limited to, a shower wall (or any bathing area wall) that is made with a reflective element attached to or located within the wall for one-piece installation. In other words, one region of the transparent enclosure may include an integrally formed mirror facing the interior of the enclosure but separated from that interior environment by a transparency. This embodiment would allow for shower walls and shower doors to include the mirror apparatus 10 of this invention as part of the original wall manufacturing process.

Again, the transparent enclosure may enclose a bathing area such as a shower, a bath, or a sauna. The transparent enclosure may be formed from a suitable transparent material (e.g., glass or a polymer such as plastic or fiberglass).

A reflective element would be attached to the transparent enclosure and positioned so that the reflective element reflects light into the transparent enclosure through at least one transparency. The reflective element may be formed of any suitable reflective material (e.g., a glass mirror). A sealing element could be positioned around the reflective element so that a seal forms for preventing the contact of steam (i.e., water vapor) with the surface of the reflective element. Accordingly, the sealing element can prevent water condensation from forming on the surface of the reflective element. In one embodiment, the sealing element may be the transparent region of the enclosure wall itself with the reflective element entirely surrounded by the transparent wall (i.e., the reflective element could be sandwiched within the transparent wall).

One goal of the invention is to provide a mirror facing a person within a bathing area at an appropriate height so the person can see and use the reflection through a transparency in the enclosure of that bathing area. In the drawings and the specification, typical embodiments of the invention have been disclosed. Specific terms have been used only in a generic and descriptive sense, and not for purposes of limitation. Unless otherwise noted, the inventor is not acting as a lexicographer, and terms herein are intended to have their ordinary meaning. For example, and without limitation, the term "adjustable" as used herein includes the broadest interpretation of that term including synonyms such as removable. The invention is not restricted to the slavish imitation of each and every detail set forth above. Obviously, devices may be provided which change, eliminate, or add certain specific details without departing from the scope of the invention. The scope of the invention is set forth in the following claims.

The invention claimed is:

1. A mirror apparatus for use in the presence of steam emitted by a transparent enclosure, comprising:
   a reflective element; and
   a hanging element attached to said reflective element for hanging the apparatus from the transparent enclosure;
   wherein said reflective element comprises a perimeter, and wherein the entirety of said perimeter is substantially parallel to the transparent enclosure, said reflective element being positioned such that said reflective element reflects light in a direction toward the transparent enclosure; and
   wherein said reflective element is positioned such that it remains substantially fog-free when the transparent enclosure emits steam.

2. A mirror apparatus according to claim 1 further comprising a sealing element positioned around said perimeter of said reflective element for preventing the contact of steam with said reflective element, and wherein said reflective element is positioned such that said sealing element is in direct contact with the transparent enclosure.

3. A mirror apparatus according to claim 2 wherein the sealing element comprises an elastic polymer.

4. A mirror apparatus according to claim 1 wherein the transparent enclosure encloses a bathing area.

5. A mirror apparatus according to claim 4, wherein the bathing area is selected from the group consisting of a shower, a bath, and a sauna.

6. A mirror apparatus according to claim 4 wherein the reflective element is positioned so that the transparent enclosure is between said bathing area and said reflective element.

7. A mirror apparatus according to claim 1 wherein the reflective element comprises a glass mirror.

8. A mirror apparatus according to claim 1 further comprising a second reflective element, wherein said second reflective element reflects light in a direction opposite the transparent enclosure.

9. A mirror apparatus according to claim 1 further comprising a cord for attaching said hanging element to said reflective element.

10. A mirror apparatus for use in the presence of steam emitted by a transparent enclosure, comprising:
    a reflective element comprising a perimeter, wherein the entirety of said perimeter is substantially parallel to the transparent enclosure;
    a sealing element positioned around the perimeter of said reflective element and in direct contact with the transparent enclosure for preventing the contact of steam with said reflective element; and
    a hanging element attached to said reflective element for hanging the apparatus from the transparent enclosure;
    wherein said reflective element is positioned such that said reflective element reflects light in a direction toward the transparent enclosure and said sealing element is flush with the transparent enclosure.

11. A mirror apparatus according to claim 10 wherein the sealing element comprises an elastic polymer.

12. A mirror apparatus according to claim 10 wherein the transparent enclosure encloses a bathing area.

13. A mirror apparatus according to claim 12 wherein the bathing area is selected from the group consisting of a shower, a bath, and a sauna.

14. A mirror apparatus according to claim 12 wherein the reflective element is positioned so that the transparent enclosure is between the bathing area and said reflective element.

15. A mirror apparatus according to claim 10 wherein the reflective element comprises a glass mirror.

16. A mirror apparatus according to claim 10 further comprising a second reflective element, wherein said second reflective element reflects light in a direction opposite the transparent enclosure.

17. A mirror apparatus according to claim 10 further comprising a cord for attaching said hanging element to said reflective element.

18. A mirror apparatus for use in the presence of steam emitted by a transparent enclosure, comprising:

a reflective element comprising a perimeter, wherein the entirety of said perimeter is substantially parallel to the transparent enclosure;

a frame element enclosing said reflective element; and a hanging element attached to said frame element for hanging the apparatus from the transparent enclosure;

wherein said reflective element is positioned such that said reflective element reflects light in a direction toward the transparent enclosure; and wherein said reflective element is positioned such that it remains substantially fog-free when the transparent enclosure emits steam.

19. A mirror apparatus according to claim 18 further comprising a sealing element positioned around the perimeter of said reflective element for preventing the contact of steam with said reflective element, and wherein said reflective element is positioned such that said sealing element is in direct contact with the transparent enclosure.

20. A mirror apparatus according to claim 19 wherein the sealing element comprises an elastic polymer.

21. A mirror apparatus according to claim 18 wherein said frame element comprises an elastic polymer for preventing the contact of steam with said reflective element, and wherein said frame element is positioned such that said frame element is flush with the transparent enclosure.

22. A mirror apparatus according to claim 18 wherein the transparent enclosure encloses a bathing area.

23. A mirror apparatus according to claim 22, wherein the bathing area is selected from the group consisting of a shower, a bath, and a sauna.

24. A mirror apparatus according to claim 22 wherein said reflective element is positioned so that the transparent enclosure is between the shower and said reflective element.

25. A mirror apparatus according to claim 18 wherein said reflective element comprises a glass mirror.

26. A mirror apparatus according to claim 18 further comprising a second reflective element, wherein said second reflective element reflects light in a direction opposite the transparent enclosure.

27. A mirror apparatus according to claim 18, wherein said hanging element comprises a cord for attaching said hanging element to said frame element.

28. A mirror apparatus according to claim 18, wherein said hanging element has an adjustable length.

* * * * *